United States Patent
Hata et al.

(10) Patent No.: US 9,756,278 B2
(45) Date of Patent: Sep. 5, 2017

(54) IMAGE PROCESSING SYSTEM AND IMAGE CAPTURING APPARATUS

(71) Applicant: CANON KABUSHIKI KAISHA, Tokyo (JP)

(72) Inventors: Tetsuya Hata, Yokohama (JP); Jun Makino, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 14/638,995

(22) Filed: Mar. 4, 2015

(65) Prior Publication Data
US 2015/0256690 A1    Sep. 10, 2015

(30) Foreign Application Priority Data

Mar. 7, 2014   (JP) ................................ 2014-045577

(51) Int. Cl.
| | |
|---|---|
| H04N 5/77 | (2006.01) |
| H04N 9/804 | (2006.01) |
| H04N 21/2343 | (2011.01) |
| H04N 21/274 | (2011.01) |
| H04N 21/414 | (2011.01) |
| H04N 21/4223 | (2011.01) |
| H04N 21/482 | (2011.01) |
| H04N 21/658 | (2011.01) |
| H04N 21/81 | (2011.01) |

(52) U.S. Cl.
CPC ........... *H04N 5/772* (2013.01); *H04N 9/8042* (2013.01); *H04N 21/234363* (2013.01); *H04N 21/274* (2013.01); *H04N 21/41407* (2013.01); *H04N 21/4223* (2013.01); *H04N 21/482* (2013.01); *H04N 21/6582* (2013.01); *H04N 21/8153* (2013.01)

(58) Field of Classification Search
CPC ........... H04N 1/00244; H04N 5/23229; H04N 1/00209; H04N 1/00129; H04N 1/2125
See application file for complete search history.

(56) References Cited

U.S. PATENT DOCUMENTS

2004/0109063 A1* 6/2004 Kusaka .............. H04N 1/00244
                                                            348/207.1
2009/0060447 A1* 3/2009 Nakao .................... H04N 5/232
                                                            386/354

FOREIGN PATENT DOCUMENTS

JP        2008-236396 A    10/2008

* cited by examiner

*Primary Examiner* — Twyler Haskins
*Assistant Examiner* — Fayez Bhuiyan
(74) *Attorney, Agent, or Firm* — Canon U.S.A., Inc. IP Division

(57) ABSTRACT

An image processing system includes an image capturing apparatus and an image processing apparatus to perform development processing of RAW images captured by the image capturing apparatus. The image capturing apparatus includes a first development unit configured to develop a piece of RAW image data, a recording unit configured to record the piece of first developed image data, and an image display unit. The image processing apparatus includes a second development unit configured to develop the piece of RAW image data received from the image capturing apparatus and an access information transmitting unit configured to transmit a piece of access information for the obtained piece of second developed image data. The image capturing apparatus controls display of an image to be played and displayed on the display unit based on the piece of access information.

13 Claims, 8 Drawing Sheets

FIG. 3A

| IMAGE ID | IMAGE FILE NAME | CAMERA-DEVELOPED IMAGE ADDRESS INFORMATION | THUMBNAIL IMAGE INFORMATION | STREAMING DATA GENERATION FLAG | IMAGE SERVER ADDRESS INFORMATION |
|---|---|---|---|---|---|
| 0001 | MOVIE_001 | ADDRESS XXX | ADDRESS xxx | GENERATION COMPLETED | ADDRESS OOO |
| 0002 | MOVIE_002 | ADDRESS YYY | ADDRESS yyy | GENERATION IN PROGRESS (50%) | – |
| 0003 | MOVIE_003 | ADDRESS ZZZ | ADDRESS zzz | GENERATION NOT STARTED | – |
| | | | | | |

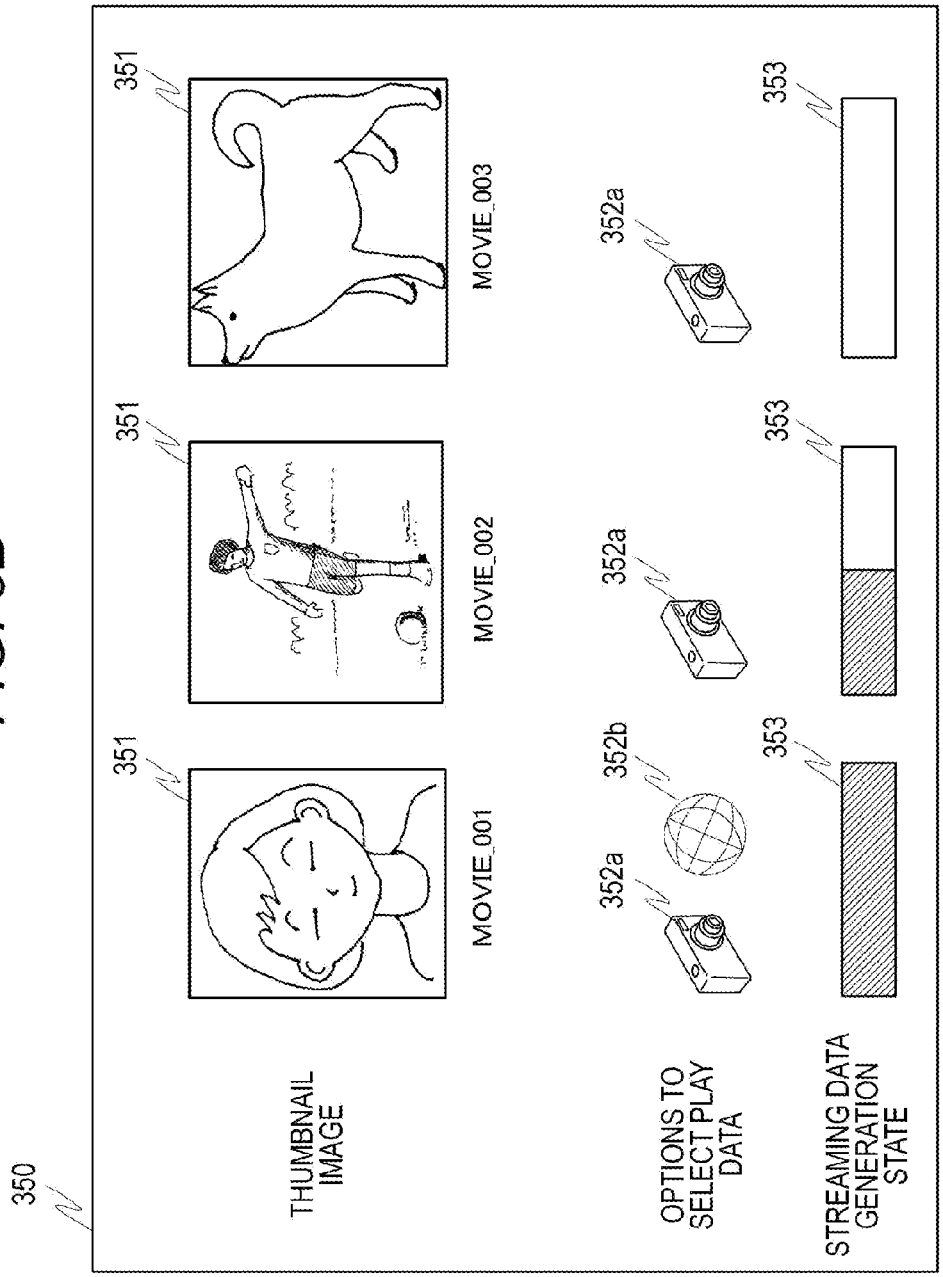

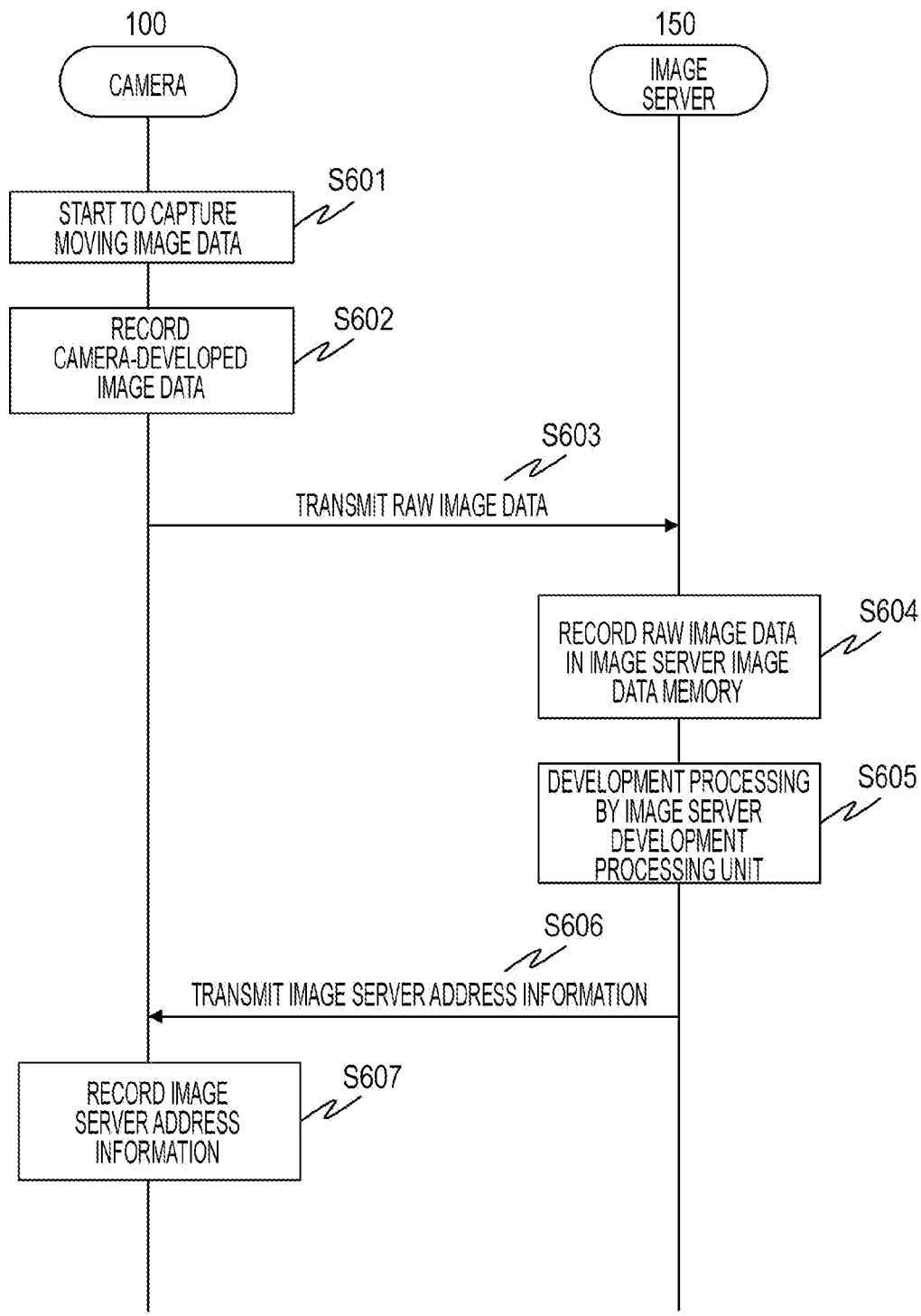

IMAGE PROCESSING SYSTEM AND IMAGE CAPTURING APPARATUS

BACKGROUND OF THE INVENTION

Field of the Invention

The present invention relates to an image processing system and an image capturing apparatus, and particularly to a technique preferable to be used in an image processing system using an image capturing apparatus capable of receiving access information for image data from an image server.

Description of the Related Art

Conventionally, there is a known technique, upon capturing an image by a camera, for causing an image processing apparatus outside of the camera to perform various types of correction processing on the captured image data signal.

In Japanese Patent Application Laid-Open No. 2008-236396, RAW image data, which is a captured image signal before development processing, is transmitted to an image server through a network and the image server is caused to perform development processing on the RAW image. The patent document discloses a technique to cause the image server to return a developed image as the resultant of the development to the camera and display the developed image on the camera side.

In Japanese Patent Application Laid-Open No. 2008-236396, RAW image data, which is a captured image signal before development processing, is transmitted to an image server through a network and the image server is caused to perform development processing on the RAW image. The patent document discloses a technique to cause the image server to return a developed image as the resultant of the development to the camera and display the developed image on the camera side.

SUMMARY OF THE INVENTION

The present invention is directed to reduce communication amount between a camera and an image processing apparatus in an image processing system, in which development processing for a RAW image captured by the camera is performed by the image processing apparatus outside the camera. The present invention is also directed to reduce image capacity of a storage unit required on the camera side.

An image processing system according to an aspect of the present invention includes an image capturing apparatus and an image processing apparatus. The image capturing apparatus includes: a first development unit configured to develop a piece of RAW image data captured by an image capturing element and generate a piece of first developed image data; a recording unit configured to record the piece of first developed image data; an image data transmitting unit configured to transmit the piece of RAW image data to the image processing apparatus; a display unit configured to display an image; and a control unit configured to control operation of the respective units of the image capturing apparatus. The image processing apparatus includes: an image data receiving unit configured to receive the piece of RAW image data from the image capturing apparatus; a second development unit configured to develop the piece of RAW image data received by the image data receiving unit and generate a piece of second developed image data; and an access information transmitting unit configured to transmit a piece of access information for the piece of second developed image data to the image capturing apparatus. The control unit controls display of an image to be played and displayed on the display unit based on the piece of access information received from the image processing apparatus.

Further features of the present invention will become apparent from the following description of exemplary embodiments (with reference to the attached drawings).

BRIEF DESCRIPTION OF THE DRAWINGS

FIG. 3A is an example of the play index data according to the first exemplary embodiment of the present invention and FIG. 3B is an example of a moving image data selection screen according to the first exemplary embodiment of the present invention.

FIG. 6 is a sequence chart of a flow of recording processing of moving image data according to a third exemplary embodiment of the present invention.

DESCRIPTION OF THE EMBODIMENTS

Figure 1:
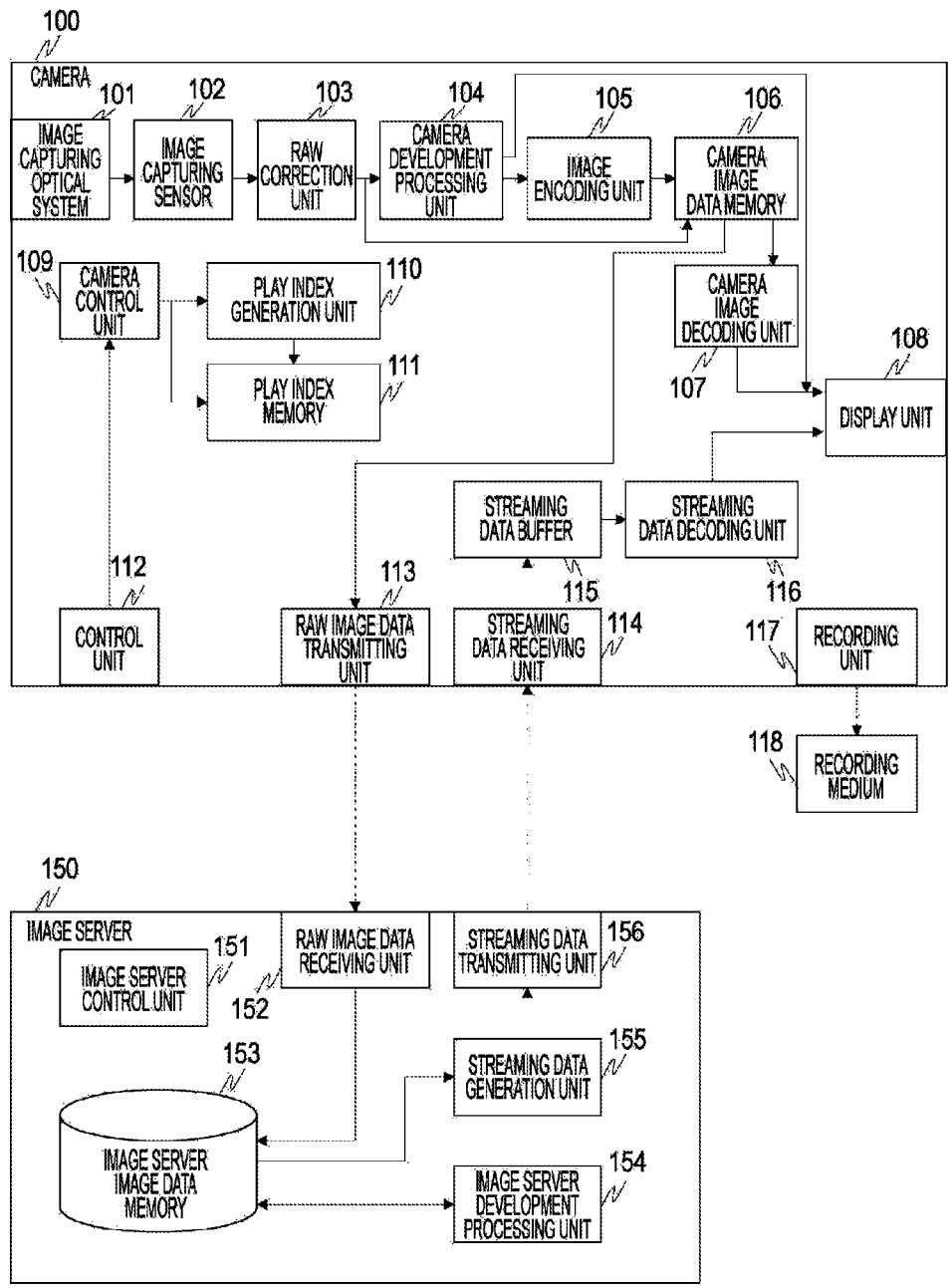
FIG. 1 is a block diagram illustrating an exemplary configuration of an image processing system according to a first exemplary embodiment of the present invention.

Preferred exemplary embodiments of the present invention will be described below with reference to the accompanying drawings.

(First Exemplary Embodiment)

An image processing system according to a first exemplary embodiment of the present invention will be described with reference to FIGS. 1A to 4.

FIG. 1A illustrates a block diagram of main components of a camera and FIG. 1B illustrates a block diagram of main components of an image server. The camera and the image server constitute an image processing system according to the first exemplary embodiment of the present invention.

In FIG. 1A, the reference sign 100 indicates a whole of the camera configured to capture images (image capturing apparatus). The camera 100 includes an image capturing optical system 101 configured to focus light beam from an object.

An image capturing sensor 102 is configured to perform photoelectric conversion of light beam having been incident on the image capturing sensor 102 by image capturing elements (not illustrated) arranged in a Bayer array and output the resultant as RAW image data meaning that the data is undeveloped (raw). A RAW correction unit 103 is configured to perform defect pixel correction and level correction on RAW image data.

A camera development processing unit 104 is configured to perform development processing on RAW image data and generate camera-developed image data. An image encoding unit 105 is configured to encode still or moving image data after the development processing and performs data compression on the resultant. A camera image data memory 106 is configured to record RAW image data and encoded camera-developed image data. A camera image decoding unit 107 is configured to decode encoded camera-developed image data. A display unit 108 presents images to a user.

A camera control unit 109 is configured to control respective units of the camera 100. A play index generation unit 110 is configured to generate play index data for managing image data to be played and displayed. A play index memory 111 is configured to record play index data.

A control unit 112 is configured to receive operations from a user. Through the control unit 112, instructions related to start/stop capturing moving images and play of moving images are input from a user. A RAW image data transmitting unit 113 is configured to transmit RAW image data to an apparatus outside the camera 100. A streaming data receiving unit 114 is configured to receive streaming moving image data from the outside of the camera 100. The RAW image data transmitting unit 113 is configured to output image data before development (RAW image data) (including data before at least a part of development processing) to an external apparatus such as an image server 150.

A streaming data buffer 115 is configured to temporarily record received streaming data. A streaming data decoding unit 116 is configured to decode the encoded streaming data.

A recording unit 117 is configured to record image data stored in the camera 100 in a recording medium or a recording apparatus outside the camera 100. A recording medium 118 is configured to record image data.

In FIG. 1B, the reference sign 150 indicates a whole of the image server (image processing apparatus). The image server 150 includes an image server control unit 151 configured to control operation of respective units of the image server 150 and a RAW image data receiving unit 152 configured to receive RAW image data captured by the camera 100. An image server image data memory 153 is configured to store image data. An image server development processing unit 154 is configured to perform development processing on the received RAW image data.

A streaming data generation unit 155 is configured to perform encoding processing and packetizing processing on image data to convert the image data to streaming data having a format suitable for streaming play. A streaming data transmitting unit 156 is configured to transmit the generated streaming data to the camera 100. The streaming data transmitting unit 156 is also configured to transmit image server address information.

Note that, the image server address information is access information used to access image data recorded in the image server image data memory 153. For example, the image server address information includes pieces of URL information assigned to respective pieces of image data recorded in the image server image data memory 153. Using a piece of the image server address information, a desired piece of moving image data can be specified from the outside of the image server 150, and transmission of streaming data corresponding to the specified piece of moving image data can be requested.

Between the RAW image data transmitting unit 113 of the camera 100 and the RAW image data receiving unit 152, and between the streaming data receiving unit 114 and the streaming data transmitting unit 156, data communication is possible through a network. Due to access information transmission from the streaming data transmitting unit 156, the camera 100 performs display control of a captured image (display image) to be displayed on the display unit 108 based on the received access information.

The camera development processing unit 104 is configured more simply in comparison to the image server development processing unit 154. For example, the camera development processing unit 104 performs development processing on reduced image data obtained by thinning out a part of pixels from RAW image data to reduce the number of pixels. In addition, the camera development processing unit 104 may only perform processing performable by a simple structure such as an $\epsilon$ filter in noise reduction processing, while the image server development processing unit 154 may perform processing of large processing amount but providing larger effect such as a bilateral filter. Thus, configuration of the camera 100 can be simplified.

Next, the basic operation of the camera 100 upon image capturing is described, and a flow of play/display processing of image data, which is characteristic to the exemplary embodiment, will then be described with reference to FIG. 2. Here, a flow of processing when the camera 100 captures a moving image will be described.

An object image having passed through the image capturing optical system 101 is focused on the image capturing sensor 102. The image capturing sensor 102 converts incident light beam to an electrical signal and then outputs the resultant to the RAW correction unit 103 as RAW image data.

The RAW correction unit 103 performs various types of correction processing on RAW image data including OB correction and defect pixel correction, and outputs a RAW image data signal after the correction to the camera development processing unit 104. The RAW correction unit 103 also outputs the RAW image data after correction to the camera image data memory 106.

The camera development processing unit 104 performs development processing on the input RAW image data. For example, the camera development processing unit 104 may perform demosaicing processing for synchronizing pieces of RAW image data arranged in a Bayer array pattern and various types of correction processing including white balance correction and gamma correction. The camera development processing unit 104 outputs the generated camera-developed image data to the image encoding unit 105.

The image encoding unit 105 performs encoding processing on the input camera-developed image data and outputs the encoded camera-developed image data to the camera image data memory 106. The camera image data memory 106 records the input RAW image data and camera-developed image data.

The camera development processing unit 104 also outputs the camera-developed image data to the display unit 108. The display unit 108 displays the input camera-developed image data on a display apparatus. Thus, a user can check image data before, during, and after capturing images.

The above described series of processing operations is repeated from the time when a user inputs an instruction to start capturing moving images through the control unit 112 until a user inputs an instruction to stop capturing moving images through the control unit 112, thereby capturing and recording of moving image data are performed. Thus, a plurality of pieces of RAW image data obtained by dividing RAW image data for frame images is recorded in the camera image data memory 106.

The basic operation upon capturing an image by the camera 100 has been described above. Next, a flow of play processing of moving image data after capturing images will be described with reference to FIGS. 2, 3A and 3B. The processing is characteristic to the exemplary embodiment.

Figure 2:
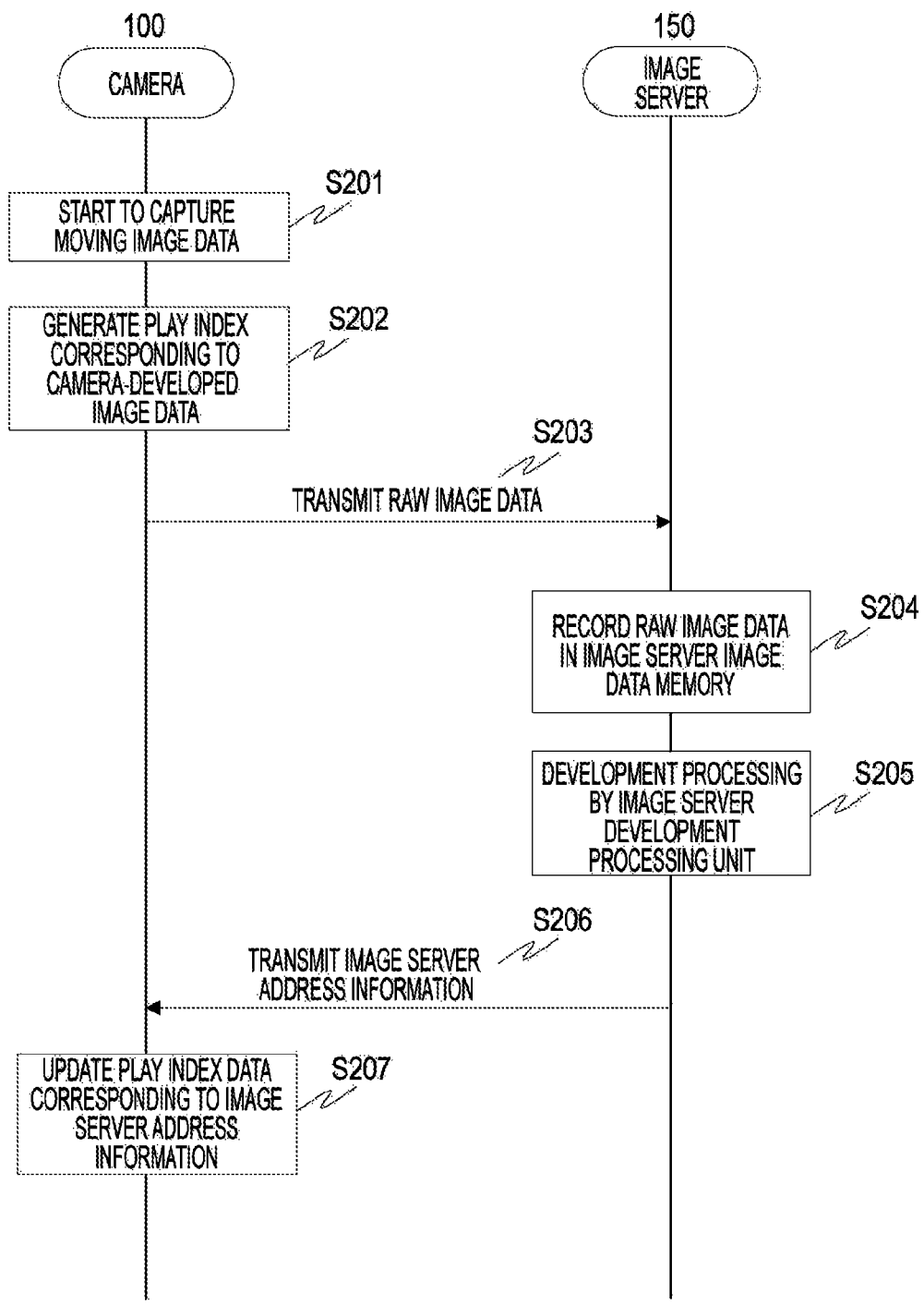
FIG. 2 is a sequence chart of a flow of processing for generating play index data according to the first exemplary embodiment of the present invention.

FIG. 2 is a sequence chart of a flow of processing related to generation of play index used to control play of captured moving image data.

In step S201, the camera 100 first captures moving image according to a user instruction. The processing here is as described above and RAW image data and encoded camera-developed image data are recorded in the camera image data memory 106.

In step S202, the camera control unit 109 generates a play index data corresponding to the recorded camera-developed image data.

Here, the play index data will be described with reference to FIGS. 3A and 3B.

FIG. 3A illustrates an example of the play index data used to control play of moving image data. The play index generation unit 110 generates play index data according to the control by the camera control unit 109 and records the play index data in the play index memory 111.

As illustrated, the play index data is a data table including elements described below.

The elements are image IDs (301) for identifying moving images, image file names (302) of image data files, pieces of address information (303) of pieces of camera-developed image data recorded in the camera image data memory 106, pieces of address information (304) of thumbnail images recorded in the camera image data memory 106, streaming data generation flags (305) as information indicating states of streaming data generation process in the image server 150, and pieces of image server address information (306) used to read out pieces of streaming data generated in the image server 150. The streaming data generation process in the image server 150 will be described in detail later.

In FIG. 3A, three examples of information indicated by the streaming data generation flag 305 are presented. First of them is "generation completed" meaning that generation of streaming data identified by the column of image ID 0001 is completed. Second of them is "generation in progress (50%)" meaning that streaming data identified by the column of image ID0002 is currently being generated and providing the progress ratio of the process.

Third of them is "generation not started" meaning that RAW image data has not been transmitted to the image server 150 presented in the column of image ID 0003, and streaming data has not been even started yet. The information of the streaming data generation flags (305) is updated through appropriate communication between the play index generation unit 110 and the image server 150.

Step S202 is a stage right after capturing of a moving image is finished. Thus, a piece of the play index data to be generated is as that presented in the column image ID 0003 in FIGS. 3A. Specifically, pieces of information of the camera-developed image data generated in step S201 are recorded as the image file name 302, the piece of camera-developed image address information 303, and the piece of thumbnail image information 304. Meanwhile, since the image server 150 has not performed the development processing, "generation not started" is set in the streaming data generation flag 305.

In step S203, the RAW image data transmitting unit 113 of the camera 100 selects a piece of RAW image data that has not been transmitted to the image server 150. The RAW image data transmitting unit 113 then reads out the piece of RAW image data from the camera image data memory 106 and transmits the piece of RAW image data to the image server 150. The RAW image data transmitting unit 113 can select a piece of RAW image data to be transmitted with reference to the information of the streaming data generation flags 305 in the play index data.

In step S204, the image server 150 records the piece of RAW image data received from the camera 100 outside thereof through the RAW image data receiving unit 152 in the image server image data memory 153.

In step S205, the image server development processing unit 154 of the image server 150 reads out the piece of RAW image data from the image server image data memory 153 and performs the development processing on the read out piece of RAW image data. The image server development processing unit 154 performs calculation processing with a load higher than that of the development processing performed by the camera development processing unit 104, and the development results in higher resolution and higher image quality than the camera development processing unit 104. The image server development processing unit 154 outputs a piece of image server-developed image data, which is the resultant of the development processing, to the image server image data memory 153 and makes the image server image data memory 153 to record the piece of image server-developed image data.

In step S206, the image server control unit 151 of the image server 150 generates a piece of image server address information associated with the piece of image server-developed image data generated in step S205. The image server control unit 151 then performs address information transmission processing to transmit the piece of image server address information to the camera 100 through the streaming data transmitting unit 156. After the transmission of the piece of image server address information, the camera control unit 109 of the camera 100 receives the piece of image server address information through the streaming data receiving unit 114.

In step S207, the play index generation unit 110 of the camera 100 updates the play index data based on the piece of image server address information received from the image server 150. Specifically, the play index generation unit 110 updates the streaming data generation flag 305, which was set to "generation not started" in step S202, to "generation completed". The play index generation unit 110 also records the transmitted piece of image server address information as the piece of image server address information 306.

The flow of the generation of the play index data and the update processing has been described. Next, the flow of movie play processing performed by the camera 100 will be described with reference to FIGS. 3B and 4. FIG. 3B illustrates an operation screen displayed on the display unit 108 by the camera control unit 109 when a user selects a piece of movie play data. On the operation screen, options corresponding to the play index data illustrated in FIG. 3A are presented.

In FIG. 3B, thumbnail images 351 of the respective pieces of the moving image data and options 352a and 352b to select a piece of moving data to be played. As the options, camera-developed image data 352a and streaming data corresponding to image server-developed image data 352b are presented. Therefore, no icons of the option 352b is presented for the moving images having image file names "MOVIE_002" and "MOVIE_003", streaming data of which has not been generated.

Figure 4:
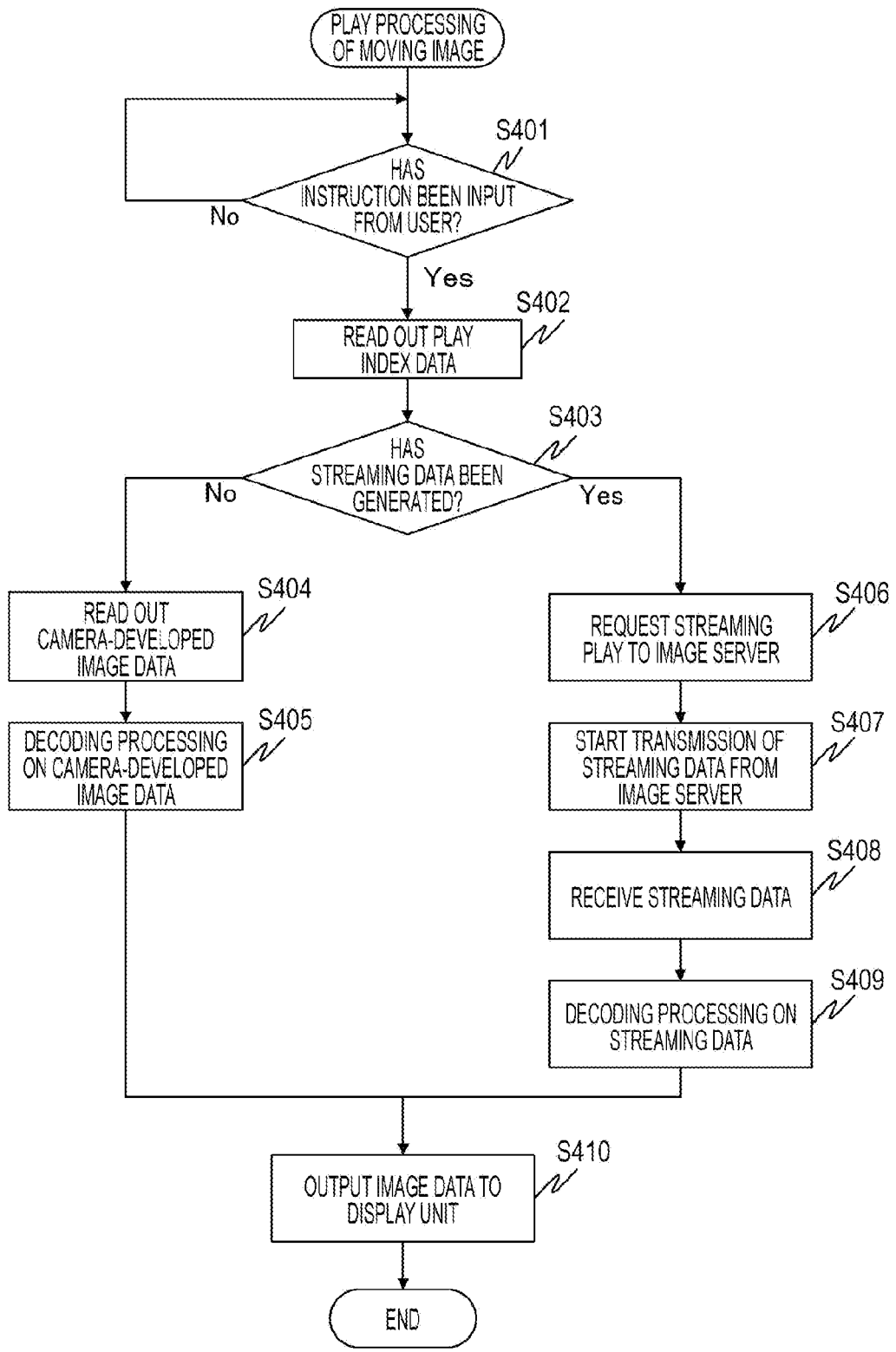
FIG. 4 is a flowchart of a flow of play processing of a moving image according to the first exemplary embodiment of the present invention.

Next, the flow of the play processing of a moving image performed by the camera 100 will be described with reference to a flowchart of FIG. 4.

First, in step S401, the camera 100 determines whether a user has selected a moving image and has input an instruction to start to play the moving image by operating the control unit 112. When such an instruction has been input, the processing proceeds to step S402 and when such an instruction has not been input, the camera 100 waits for an instruction.

In step S402, the camera control unit 109 reads out a piece of play index data corresponding to the moving image file specified in step S401 from the play index memory 111.

In step S403, the camera control unit 109 refers to the streaming data generation flag 305 of the read out piece of play index data to determine whether streaming data has been generated. When streaming data has not been generated, the processing proceeds to step S404 and when streaming data has been generated, the processing proceeds to step S406.

In step S404, the camera control unit 109 controls in such a manner to read out a piece of camera-developed image data from the camera image data memory 106 referring to a piece of the camera-developed image address information 303 in the piece of play index data and output the piece of camera-developed image data to a camera image decoding unit 107.

In step S405, the camera image decoding unit 107 decodes the input piece of camera-developed image data and outputs the resultant to the display unit 108.

On the other hand, in step S406, the camera control unit 109 refers the piece of image server address information 306 of the piece of play index data and requests the image server 150 to start transmission of the streaming data corresponding to the selected moving image file.

In step S407, the image server control unit 151 of the image server 150 reads out the requested piece of image server-developed image data from the image server image data memory 153 based on the received piece of image server address information. The image server control unit 151 outputs the read out piece of image server-developed image data to the streaming data generation unit 155.

The streaming data generation unit 155 performs encoding processing and packetizing processing on the input piece of image server-developed image data to convert the piece of image data to a data format for streaming and transmits the resultant to the streaming data transmitting unit 156. The streaming data transmitting unit 156 transmits the input streaming data to the camera 100 packet by packet sequentially so as to start transmission of the streaming data.

In step S408, the streaming data receiving unit 114 of the camera 100 receives the packetized streaming data and outputs the data packet by packet sequentially to the streaming data buffer 115 so as to store therein.

In step S409, the streaming data decoding unit 116 reads out streaming data accumulated in the streaming data buffer 115 packet by packet sequentially, performs decoding processing thereon, and outputs the decoded image data signal to the display unit 108.

The streaming data decoding unit 116 deletes the read out streaming data from the streaming data buffer 115. Therefore, the streaming data buffer 115 is required to have a capacity enough to record a packet of data obtained by dividing moving image data. Since the streaming play is used as described above, a capacity of a data buffer required for the camera 100 can be reduced.

In step S410, the display unit 108 sequentially displays image data signals and play and display moving images input from the camera image decoding unit 107 or the streaming data decoding unit 116 on an unillustrated display apparatus.

As described above, in the present exemplary embodiment, if development processing in the image server 150 is completed when captured moving image data is played and displayed, the resultant of the development processing is played in stream. If the development processing in the image server 150 is not completed, the resultant of development by the camera 100 is played.

Thus, a user can play and display a piece of moving image data having high image quality if the piece of moving image data developed by the image server 150 exists. In addition, since streaming play is performed from the image server 150, whole of a piece of image server-developed image data is not required to be accumulated in the camera 100 previously, enabling reduction of the capacity of a data buffer required for the camera 100. Further, since image data communication is performed only for a moving image for which a play instruction is input from a user, useless data communication is eliminated, enabling reduction of process load in data communication.

Meanwhile, in the above-described present exemplary embodiment, streaming play of a piece of image server-developed image data is selected if the piece of image server-developed image data has been generated when data play of moving image is started, but the present invention is not limited to the way of selecting a moving image to be played. Specifically, any way of selecting a moving image is available as long as the selection is made based on image server address information received from the image server.

For example, when the piece of image server address information is received in the middle of playing a piece of moving image data, the play may be switched to streaming play of a piece of image server-developed image data in the middle of the play. In this case, the camera control unit 109 specifies the piece of moving image data for streaming play using the piece of image server address information and also transmits frame number information of a frame image, which is currently displayed, to the image server 150. Thus, play of a piece of camera-developed image data can be switched to streaming play of a piece of image server-developed image data in the middle of playing a moving image.

The camera control unit 109 may control in such a manner to select a moving image to be played according to the communication state between the camera 100 and the image server 150 in addition to the image server address information. Specifically, the camera control unit 109 may control to select a piece of camera-developed image data to be played when the communication speed between the camera and the image server is lower than the data rate of streaming data.

The camera control unit 109 may control in such a manner to select a moving image to be played according to the communication state between the camera 100 and the image server 150 in addition to the image server address information. Specifically, the camera control unit 109 may control to select a piece of camera-developed image data to be played when the communication speed between the camera and the image server is lower than the data rate of streaming data.

The selection of play of a piece of camera-developed image data or streaming play of a piece of image server-developed image data may be selected by a user. Specifically, as illustrated in FIG. 3B, selectable options including play of a piece of camera-developed image data and streaming play of a piece of image server-developed image data may be displayed on the display unit 108 and a user may be prompted to select one from the options. Thus, a user can control play of moving image data according to his/her intension.

The present exemplary embodiment has been described such that only one type of the development processing is performed in the image server, but the present invention does not limit the development processing in an image processing apparatus outside the camera thereto. The development processing in the image server 150 may be performed by using a plurality of different development parameters or a plurality of different types of development processing.

In this case, the image server control unit 151 generates different pieces of image server address information for respective pieces of image server-developed image data using the plurality of development parameters or the plurality of types of development processing and transmits the pieces of image server address information to the camera. In this case, the image server control unit 151 may present options of the plurality of pieces of image server-developed image data on the selection screen of moving image data illustrated in FIG. 3B and control the selection screen to allow a user to select one of the options.

In the above-described present exemplary embodiment, the play index generation unit 110 records both of camera-developed image data and image server address information after the reception of the image server address information, but the present invention is not limited to the way of recording image data. For example, the play index generation unit 110 may control to delete a piece of camera-developed image data after the reception of the corresponding piece of image server address information.

Alternatively, the play index generation unit 110 may perform reduction processing to further reduce the number of pixels of a piece of camera-developed image data after the reception of the piece of image server address information, and hold the resultant as a piece of image data having a small data size for preview. Thus, a capacity of data memory required for the camera can be reduced.

The present exemplary embodiment has been described such that the image server control unit 151 controls to transmit the image server address information when the image server completes the development processing, but the present invention does not limit the timing to transmit the image server address information thereto. For example, data in the image server may be moved and edited corresponding to an instruction from a user or an instruction from an image server manager. In this case, the image server control unit 151 controls to newly generate image server address information and transmit the image server address information from the image server to the camera.

On the other hand, editing processing on camera-developed image data may be performed on the camera side. In this case, the camera transmits an editing content performed on a piece of camera-developed image data to the image server, and the image server performs the same editing processing on the piece of image server-developed image data. The image server then generates a piece of image server address information for the newly generated piece of image server-developed image data as the result of the edition and transmits the piece of image server address information to the camera. Thus, even when image data is edited on the camera side, streaming play of moving images desired by a user is possible.

(Second Exemplary Embodiment)

In the above-described first exemplary embodiment, a case where play of camera-developed image data or streaming play of image server-developed image data is selected and played upon moving image play by the camera 100 is described.

Next, as a second exemplary embodiment of the present invention, a case where moving image data captured by the camera 100 is moved or copied to the outside of the camera 100 will be described.

The configurations of the camera 100 and the image server 150 according to the second exemplary embodiment are similar to those of the first exemplary embodiment illustrated in FIG. 1, and thus the redundant description thereof will be avoided. In addition, the photographing operation by the camera 100 and processing for generating play index data are similar to those of the first exemplary embodiment illustrated in FIG. 2, and thus the redundant description thereof will be avoided.

Figure 5:
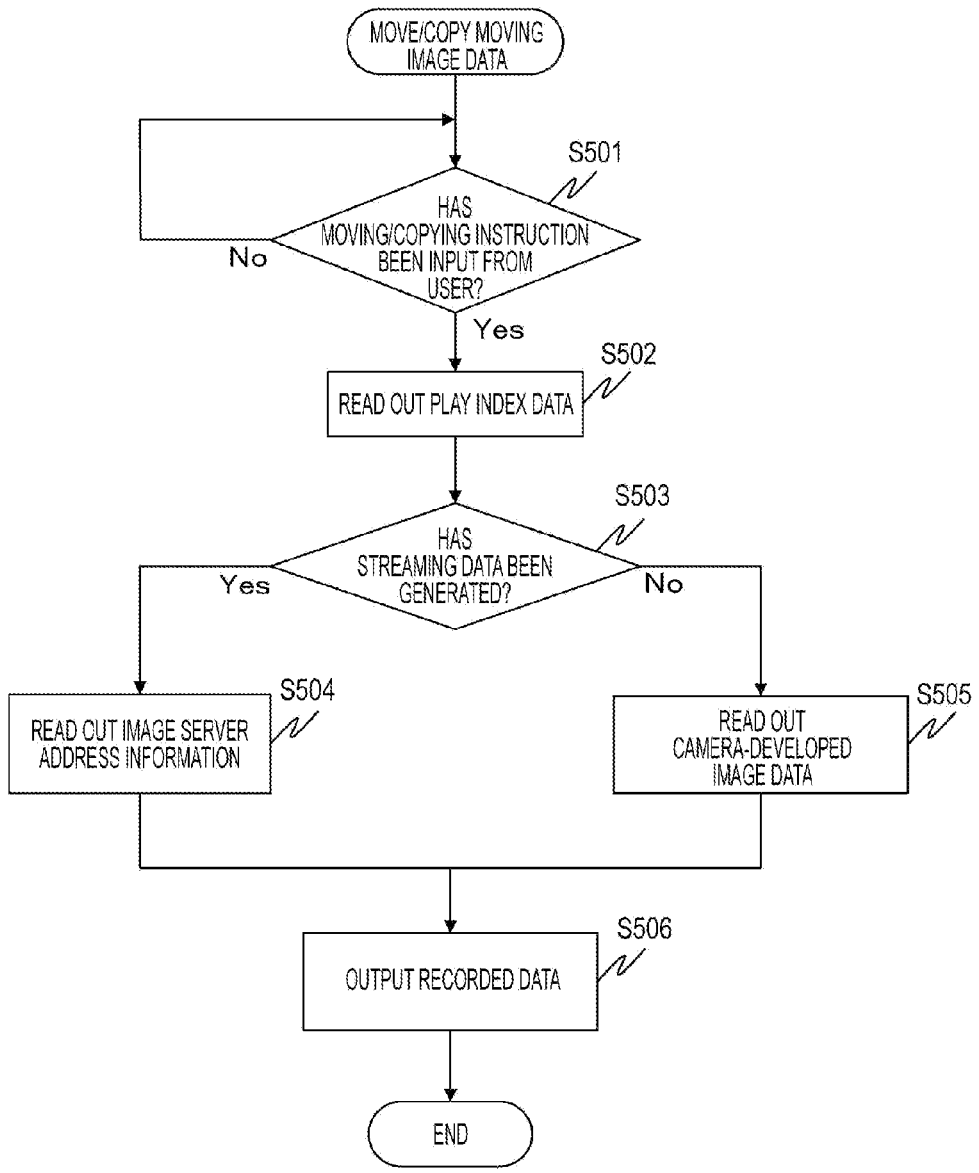
FIG. 5 is a flowchart of a flow of processing of moving/copying moving image data according to a second exemplary embodiment of the present invention.

Next, with reference to FIG. 5, a flow of moving or copying processing of captured moving image data, which is characteristic processing of the second exemplary embodiment, will be described. FIG. 5 illustrates a flowchart presenting a content of processing performed by the respective units of the camera 100 upon moving or copying processing of captured moving image data.

First, in step S501, the camera 100 waits for an instruction for moving/copying processing of moving image data from a user through the control unit 112. A user selects a moving image to be moved or copied looking at the display screen as illustrated in FIG. 3B and instructs to move or copy the moving image. When a user inputs an instruction, the processing proceeds to step S502.

In step S502, the camera control unit 109 reads out a piece of play index data corresponding to the moving image specified by the user from the play index memory 111.

In step S503, the camera control unit 109 refers to information of the streaming data generation flag 305 of the read out piece of play index data. The camera control unit 109 then determines whether a piece of streaming data has been generated, specifically, the development processing by the image server 150 is completed. When the streaming data has been generated, the processing proceeds to step S504, and when the streaming data has not been generated, the processing proceeds to step S505.

In step S504, the camera control unit 109 reads out the piece of image server address information 306 corresponding to the moving image instructed by the user and outputs the piece of information to the recording unit 117.

In step S505, the camera control unit 109 reads out a piece of camera-developed image data corresponding to the moving image instructed by the user and outputs the piece of data to the recording unit 117.

In step S506, the recording unit 117 outputs either the input piece of image server address information or the piece of camera-developed image data to the recording medium 118 to record it in the recording medium 118. Meanwhile, for an instruction to move a piece of moving image data, the corresponding piece of camera-developed image data or play index data is deleted.

As described above, in the present exemplary embodiment, captured moving image data is moved or copied to the outside of the camera 100 as follows. When the corresponding piece of image server address information exists, only the piece of image server address information is moved or copied without moving or copying a piece of camera-developed image data. Thus, data amount to be moved or copied can be reduced, enabling to reduce the load of communication. In addition, the data capacity required for a recording medium or a recording apparatus outside the camera 100 can be reduced.

(Third Exemplary Embodiment)

In the above-described first exemplary embodiment, a case where the camera 100 generates play index data and controls to play and display a moving image is described.

Next, as a third exemplary embodiment of the present invention, a case where play and display of a moving image is controlled without using play index data will be described.

The configurations of the camera 100 and the image server 150 according to the third exemplary embodiment are similar to those of the first exemplary embodiment illustrated in FIG. 1, and thus the redundant description thereof will be avoided. However, the play index generation unit 110 and the play index memory 111 are not used since play index data is not used in the present exemplary embodiment.

Next, with reference to FIG. 6, a flow of recording processing of moving image data according to the present exemplary embodiment will be described. FIG. 6 illustrates a sequence chart presenting a flow of processing performed by the camera 100 and the image server 150 upon capturing and recording moving image data according to the present exemplary embodiment.

First, in step S601, the camera 100 captures a piece of moving image data according to a user instruction. The flow of capturing processing is similar to that of the first exemplary embodiment described in step S201 of FIG. 2, and thus the redundant description thereof will be avoided.

In step S602, the captured piece of camera-developed image data is recorded in the camera image data memory 106. Here, the recording processing in the camera image data memory 106 will be described with reference to FIGS. 7A and 7B.

Figure 7B:
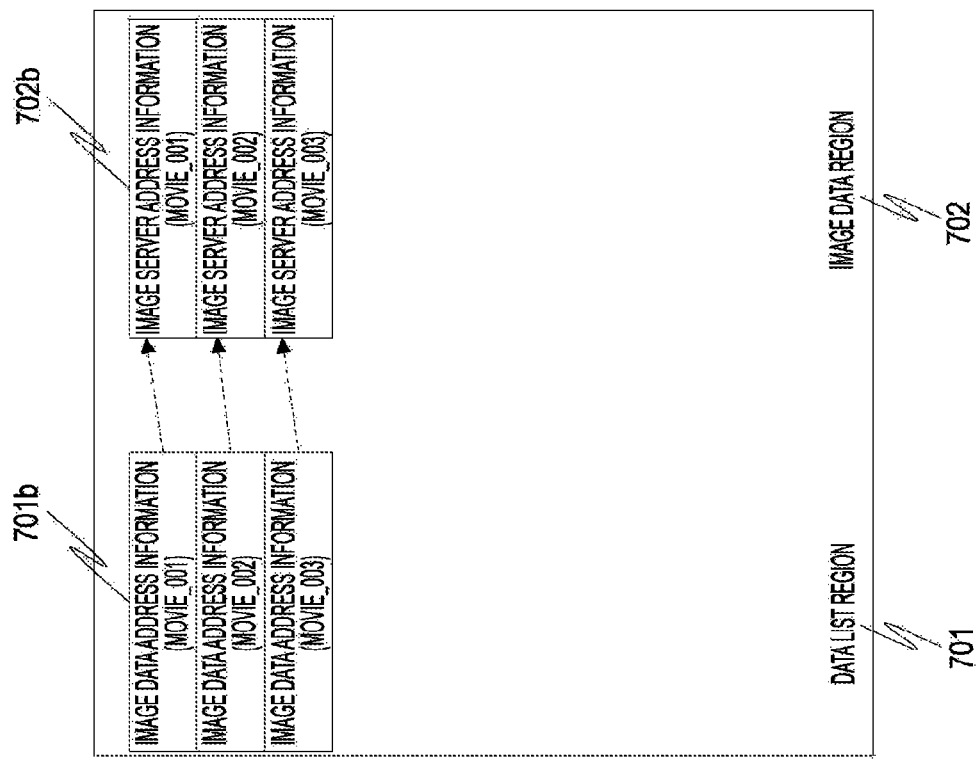
FIGS. 7A and 7B illustrate a state of recording moving image data according to the third exemplary embodiment of the present invention.
Figure 7A:
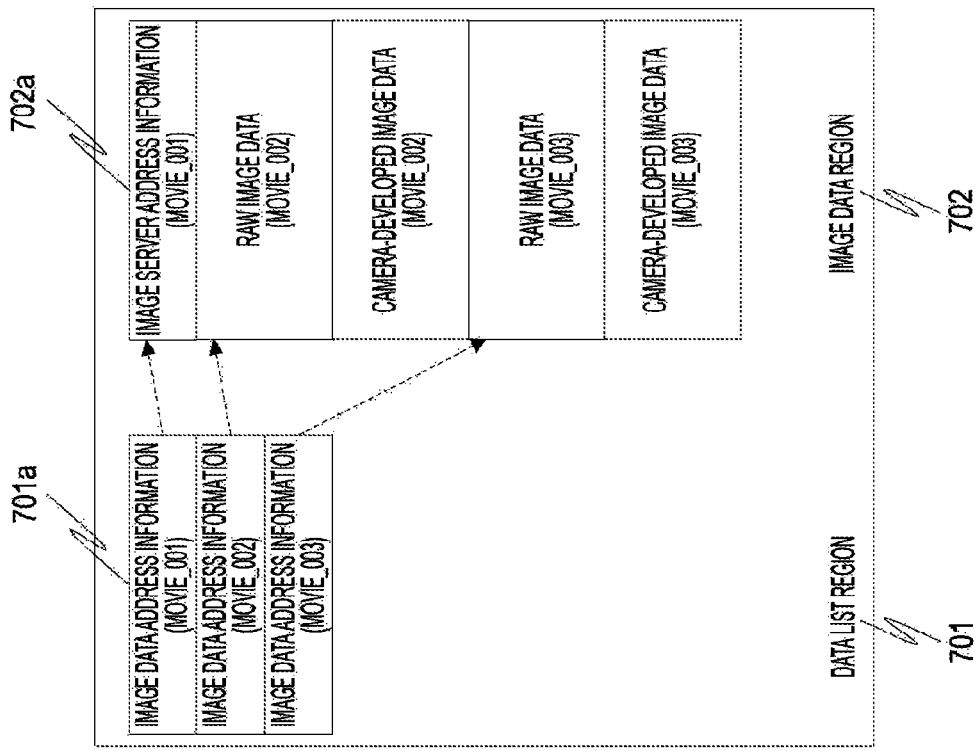

FIGS. 7A and 7B schematically illustrate image data recorded in the camera image data memory 106. FIG. 7A illustrates the image data right after capturing moving image data (corresponding to step S602) and FIG. 7B illustrates the image data after some time elapses from the time of capturing moving image data (step S607).

In FIGS. 7A and 7B, data list regions 701a and 701b are illustrated. In the data list regions 701a and 701b, pieces of address information indicating heads of regions, in which respective pieces of image data are record, are recorded in a list format. The respective pieces of image data are recorded in image data regions 702a and 702b. Assuming here that the moving image captured in step S601 is "MOVIE_003", a piece of camera-developed image data and a piece of RAW image data are recorded for "MOVIE_003".

Next, in step S603, the camera control unit 109 reads out pieces of RAW image data from the camera image data memory 106 and transmits the pieces of RAW image data to the image server 150 through the RAW image data transmitting unit 113 similarly to step S203 of FIG. 2.

In step S604, the image server 150 records the pieces of RAW image data received through the RAW image data receiving unit 152 in the image server image data memory 153 similarly to step S204 of FIG. 2.

In step S605, the image server development processing unit 154 of the image server 150 performs the development processing on the pieces of RAW image data similarly to step S205 of FIG. 2.

In step S606, the image server 150 transmits pieces of image server address information needed upon streaming play of pieces of image server-developed image data to the camera 100 through the streaming data transmitting unit 156 similarly to step S206 of FIG. 2.

In step S607, the camera control unit 109 updates the information in the camera image data memory 106 based on the received pieces of image server address information. The update processing performed here will be described with reference to FIG. 7B.

Assuming that the received information in step S607 is "MOVIE_002" and "MOVIE_003", the camera image data memory 106 is updated from the state illustrated in FIG. 7A to the state illustrated in FIG. 7B. Specifically, the pieces of camera-developed image data and the pieces of RAW image data for "MOVIE_002" and "MOVIE_003" are deleted and pieces of image server address information therefor are recorded instead.

The flow of capturing and recording processing of moving image data according to the present exemplary embodiment has been described.

After that, when a user specifies a piece of moving image data to be played and displayed through the control unit 112, the camera control unit 109 reads out the data list region 701 recorded in the camera image data memory 106 and reads out the corresponding piece of image data.

When information recorded in image data region 702 is a piece of camera-developed image data, the camera control unit 109 controls to display and play the piece of camera-developed image data on the display unit 108 through the camera image decoding unit 107.

On the other hand, when information recorded in the image data region 702 is a piece of image server address information, the camera control unit 109 requests the image server 150 to transmit a corresponding piece of image server-developed image data as streaming data. The camera control unit 109 then receives the streaming data and controls to display and play the received streaming data on the display unit 108.

As described above, in the present exemplary embodiment, recording information for captured moving image data is updated corresponding to the receiving state of image server address information from the image server. Thus, if the development processing is completed by the image server 150 when moving image data is played and displayed, streaming play of the resultant is performed. If the development processing is not completed by the image server 150, the resultant of development by the camera 100 can be played. In this case, the receiving state may be displayed on the display unit 108.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-045577, filed Mar. 7, 2014, which is hereby incorporated by reference herein in its entirety.

What is claimed is:

1. An image processing system comprising an image capturing apparatus and an image processing apparatus outside the image capturing apparatus, wherein
the image capturing apparatus includes:
a first development unit configured to develop RAW image data captured by an image capturing element and generate first developed image data;
a recording unit configured to record the first developed image data;
an image data transmitting unit configured to transmit the RAW image data to the image processing apparatus through a network;
a display unit configured to display an image; and
a control unit configured to control operation of the respective units of the image capturing apparatus,
the image processing apparatus includes:
an image data receiving unit configured to receive the RAW image data from the image capturing apparatus through the network;
a second development unit configured to develop the RAW image data received by the image data receiving unit and generate second developed image data; and
an access information transmitting unit configured to transmit access information for the second developed image data to the image capturing apparatus after the second development unit finishes developing, and
wherein the control unit controls so as to display either the first developed image data in the image capturing apparatus or the second developed image data in the image processing apparatus on the display unit based on the access information received from the image processing apparatus.

2. The image processing system according to claim 1, wherein
the control unit receives the second developed image data from the image processing apparatus based on the access information and displays the received second developed image data on the display unit.

3. The image processing system according to claim 1, wherein
the second developed image data is played in stream and displayed on the display unit.

4. The image processing system according to claim 1, wherein
the RAW image data is moving image data, and
the control unit switches to a play of the second developed image data when the access information is received in the middle of a playing of the first developed image data.

5. The image processing system according to claim 1, wherein
the control unit selects to display the second developed image data when the control unit has received the access information.

6. The image processing system according to claim 1, wherein
the control unit switches the selection of an image to be displayed to the second developed image data when the control unit receives the access information for the second developed image data during display of the first developed image data.

7. The image processing system according to claim 1, wherein
the control unit selects either the first developed image data or the second developed image data to be displayed depending on a communication state of data with the image processing apparatus.

8. The image processing system according to claim 1, wherein
the first development unit is configured more simply than the second development unit.

9. The image processing system according to claim 1, wherein
the display unit displays a receiving state of the access information.

10. The image processing system according to claim 1, wherein
the image processing apparatus generates the second developed image data in a plurality and generate pieces of access information for the respective pieces of second developed image data, and the access information transmitting unit transmits the pieces of access information to the image capturing apparatus.

11. An image capturing apparatus configured to communicate with an external image processing apparatus through a network, the apparatus comprising:
a first development unit configured to develop RAW image data captured by an image capturing element and generate first developed image data;
a recording unit configured to record the first developed image data;
an image data transmitting unit configured to transmit the RAW image data to the image processing apparatus through the network;
a receiving unit configured to receive access information used to access second developed image data obtained through development of the RAW image data by the image processing apparatus, after the image processing apparatus finishes developing;
a display unit configured to display an image; and
a control unit configured to control operation of the respective units of the image capturing apparatus, wherein
the control unit controls so as to display either the first developed image data in the image capturing apparatus or the second developed image data in the image processing apparatus on the display unit based on the access information received from the image processing apparatus.

12. A control method of an image capturing apparatus communicating with an external image processing apparatus through a network, the method comprising:
a first development step for developing RAW image data captured by an image capturing element and generating first developed image data;

a recording step for recording the first developed image data;

an image data transmission step for transmitting the RAW image data to the image processing apparatus through the network;

a receiving step for receiving access information used to access a second developed image data obtained through development of the RAW image data by the image processing apparatus, after the image processing apparatus finishes developing;

a display step for displaying an image on a display apparatus; and a control step for controlling operation of the respective units of the image capturing apparatus, wherein in the control step, control so as to display either the first developed image data in the image capturing apparatus or the second developed image data in the image processing apparatus on the display apparatus based on the access information received from the image processing apparatus.

13. A non-transitory computer-readable storage medium storing a computer executable program instructing a computer to perform a control method of an image capturing apparatus communicating with an external image processing apparatus through a network, the program instructing a computer to perform:

a first development step for developing RAW image data captured by an image capturing element and generating first developed image data;

a recording step for recording the first developed image data;

an image data transmission step for transmitting the RAW image data to the image processing apparatus through the network;

a receiving step for receiving access information used to access a second developed image data obtained through development of the RAW image data by the image processing apparatus, after the image processing apparatus finishes developing;

a display step for displaying an image on a display apparatus; and a control step for controlling operation of the respective units of the image capturing apparatus, wherein in the control step, control so as to display either the first developed image data in the image capturing apparatus or the second developed image data in the image processing apparatus on the display unit based on the access information received from the image processing apparatus.

\* \* \* \* \*